United States Patent Office 3,636,154
Patented Jan. 18, 1972

3,636,154
METHOD OF PREPARING BIS-DIFLUORO-
AMINO-BIS-NITROAMINO-ALKANES
David C. Sayles, Huntsville, Ala., assignor to the United States of America as represented by the Secretary of the Army
No Drawing. Filed Mar. 26, 1963, Ser. No. 268,535
Int. Cl. C07c 87/22, 111/00
U.S. Cl. 260—583 C     3 Claims The invention described herein may be manufactured and used by or for the Government for governmental purposes without the payment of any royalty thereon.

This invention relates to high energy oxidizers and a method for their preparation. More particularly, the invention concerns high energy oxidizers useful in gas generating compositions, especially rocket propellants, wherein large quantities of gaseous materials are produced through the combustion of various fuels, and a method for producing such oxidizers.

In the field of solid rocket propellant compositions, there has been considerable effort to prepare compositions capable of producing greater thrust. Many avenues of approach have been followed to achieve this goal. High energy compounds which serve as fuels and/or oxidizers as well as binders have been developed. Metallic fuels are also employed to achieve higher energy.

One means of achieving greater thrust in propellant compositions is through the use of high energy oxidizers. Such oxidizers are generally characterized by the presence of the difluoroamino group, —$NF_2$, or the nitro group, —$NO_2$. Oxidizers of this type furnish sufficient oxygen or fluorine to oxidize substantial amounts of fuels such as aluminum, magnesium, boron, and beryllium as well as the oxidizable material in the compounds of which they are a part.

It would be desirable to have high energy oxidizers characterized by the presence of both the nitro and difluoroamino groups. One means by which this could be accomplished would be through the simultaneous addition reaction of dinitrogen tetraoxide and tetrafluorohydrazine, nitrogen trifluoride, or difluoroamine to alkenes and alkynes according to the following reactions:

(a) $2H_2C=CHX+N_2O_4+N_2F_4 \rightarrow 2H_2C(NO_2)CHX(NF_2)$ (b) $2H_2C=CHX+N_2O_4+2HNF_2 \rightarrow 2H_2C(NO_2)CHX(NF_2)+H_2$ (c) $2H_2C=CHX+N_2O_4+2NF_3 \rightarrow 2H_2C(NO_2)CHX(NF_2)+F_2$ (d) $2HC\equiv C-CH_2X+N_2O_4+N_2F_4 \rightarrow$
$2HC(NO_2)=C(NF_2)-CH_2X$
$2HC(NO_2)=C(NF_2)-CH_2X+N_2O_4+N_2F_2 \rightarrow$
$2HC(NO_2)_2-C(NF_2)_2-CH_2X$ In (a) through (d) X is a halogen or other functional group that would permit the product to have a reactive group which could combine with other propellant ingredients during curing. When X is halogen, for example, the halogen could be converted to other functional groups such as the hydroxy group. The compound could then be reacted with isocyanate groups in certain polymeric substances used as binders in propellants.

Actual laboratory preparation according to the above listed chemical reactions proved to be complicated. Therefore, a more satisfactory means of preparing the fluoronitro oxidizers was needed. As used herein, the term, "fluoronitro oxidizer," is descriptive of those oxidizers containing both nitro and difluoroamino groups.

It has now been determined that an unusually valuable class of fluoronitro oxidizer can be prepared by reacting an organic diisocyanate of the formula $$O=C=N-R-N=C=O$$

with dinitrogen tetraoxide and tetrafluorohydrazine. In the above formula, R is a lower alkenylene group of up to six carbon atoms. Illustrative of these alkenylene groups are the following:

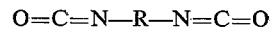
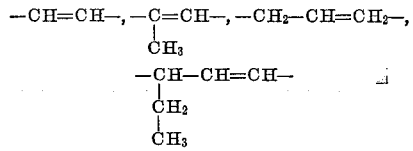

and —CH=CH—CH=CH—. However, due to practical consideration, it is preferred that R be a vinylene group of the formula

wherein A and D are each hydrogen or lower alkyl groups as, for example, methyl or ethyl groups. The vinylene group itself, —CH=CH—, is especially preferable since it has the least number of carbon atoms for the number of nitro and difluoroamino groups in the compound.

When the alkylene diisocyanates are reacted with dinitrogen tetraoxide and tetrafluorohydrazine, a compound of the type

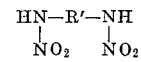

is produced wherein R' is a lower alkylene group of up to six carbon atoms having substituted thereon at each of two adjacent carbon atoms a difluoroamino group. Examples of R' are the following:

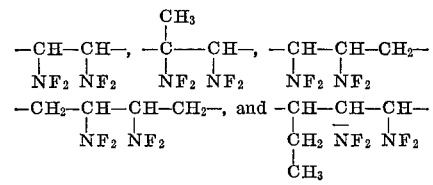

However, alkylene groups of the type

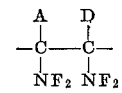

wherein A and D are each hydrogen or lower alkyl groups such as methyl or ethyl are preferred. The 1,2-bis(difluoroamino) ethylene group itself,

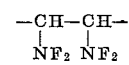

is the most preferred member since it has the least number of carbon atoms per nitro and difluoroamino groups and thus has more fluorine and oxygen available for combustion of other materials.

In the exemplary propellant compositions discussed hereinafter wherein the fluoronitro compounds of the invention are used as oxidizers, a specific impulse of 291 seconds is possible. However, the maximum specific impulse of propellant compositions using the conventional oxidizers such as ammonium perchlorate or potassium perchlorate is approximately 250 seconds. Therefore, efficient rocket engines can achieve an increase of specific impulse of over 16% with the fluoronitro oxidizers of the invention.

Generally, the fluoronitro oxidizers are prepared by reacting the diisocyanate with dinitrogen tetraoxide and tetrafluorohydrazine in the presence of an inert solvent. Because dinitrogen tetraoxide and tetrafluorohydrazine are gaseous at ordinary temperature and pressure, the reactants and solvents are mixed at reduced temperature to prevent undue loss of the reactants. The temperature of a liquid nitrogen bath is ideal for the mixing operation. The reactants are then heated at a temperature of about 150° F. to about 250° F., preferably within the range of about 200° F. to about 250° F. for several hours to accelerate the reaction. Due to the gaseous reactants, the heating step is conducted under superatmospheric pressure of 500 p.s.i. to 1000 p.s.i. After the heating step the reaction mass is allowed to cool and any unreacted gases are vented. Any unreacted dissolved gases can be removed by bubbling dry nitrogen through the dissolved product. Finally, the solvent is removed by evaporation at reduced pressure.

The perhalohydrocarbons are the preferred solvents. Examples of such solvents are dichlorodifluoromethane and chlorotrifluoromethane. These solvents are unreactive and withstand the temperature ranges encountered in the process.

The following examples further illustrate the preparation of the fluoronitro oxidizers of the invention.

EXAMPLE I

Preparation of 1,2-bis(difluoroamino)-1,2 bis(nitroamino)ethane

A small stainless pressure vessel is immersed in a liquid nitrogen bath. Into this vessel is poured 100 milliliters of chlorotrifluoromethane and 11 grams (0.1 mole) of 1,2-vinylene diisocyanate. Then 37 grams (0.4 mole) of dinitrogen tetraoxide and 21 grams (0.4 mole) of tetrafluorohydrazine are charged to the vessel and pressurized with nitrogen to a pressure of 500 p.s.i. The vessel is placed in a pressure autoclave and heated for 6 hours at a temperature maintained between 200° F. and 250° F. The reaction mixture is allowed to cool to room temperature and all unreacted gases are vented and condensed for further use. Dry nitrogen is used to displace the final residue of dissolved gases. The product is isolated from the solvent by evaporation of the solvent at 75° F. and 2 to 5 mm. pressure (mercury). The product is a straw colored liquid boiling at 150° C. at a pressure of 8 mm. of mercury.

EXAMPLE II

Preparation of 1-methyl-1,2-bis(difluoroamino)-1,2-bis(nitroamino)ethane

By substituting 1-methyl-1,2-vinylene diisocyanate for the 1,2-vinylene diisocyanate and following the same procedure as set forth in Example I, there is prepared 1-methyl - 1,2-bis(difluoroamino) - 1,2 - bis(nitroamino)ethane, also a low boiling straw colored liquid.

The fluoronitro oxidizers of the invention can be incorporated in a variety of propellant compositions. A typical formulation would have the following ingredients:

| | Percent by weight |
|---|---|
| 1,2-bis(difluoroamino)-1,2-bis(nitroamino)ethane | 65 |
| Aluminum | 15 |
| Organic binder | 20 |

However, this composition is merely representative and is not intended to reflect a limitation in the invention. Obviously, with the incorporation of other conventional oxidizers, the weight percent of the fluoronitro oxidizer could be decreased. The use of other metallic fuels or the elimination of metallic fuels calls for an alteration in the composition. Moreover, the particular binder employed will allow variation in the propellant composition. These considerations are well known in the art. The ingredients are mixed thoroughly, poured into a suitable container, and allowed to cure. Since the fluoronitro oxidizers are volatile, it is best to provide a pressurized inert atmosphere such as helium or nitrogen to prevent undue losses during mixing and curing.

The particular organic binder employed is not critical and many are available. Examples of suitable binders are the copolymer of butadiene and acrylic acid, the polysulfide polymers produced by Thiokol Chemical Corporation such as LP-2 and LP-3, the polyurethanes such as those produced by the reaction of an aromatic diisocyanate and polypropylene glycol, and nylon. An example of a class of suitable binders and a method for incorporating them in propellant compositions is given in U.S. Pat. No. 2,941,352.

The foregoing detailed description is for the purpose of illustration only and no undue limitation is intended except as reflected in the appended claims.

I claim:

1. The method of preparing a compound of the formula

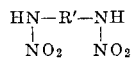

wherein R' is an alkylene group having substituted thereon at each of two adjacent carbon atoms a difluoroamino group, said method comprising reacting a diisocyanate of the formula O=C=N—R—N=C=O wherein R is a lower alkylene group with dinitrogen tetraoxide and tetrafluorohydrazine in an inert organic solvent under superatmospheric pressure at a temperature of about 150° F. to about 250° F.

2. The method of preparing a compound of the formula

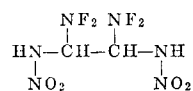

comprising the step of reacting a compound of the formula O=C=N—HC=CH—N=C=O with dinitrogen tetraoxide and tetrafluorohydrazine in an inert solvent at a temperature of about 150° F. to about 250° F.

3. The method according to claim 2, wherein said elevated temperature is maintained in the range of about 200° F. to about 250° F.

References Cited

UNITED STATES PATENTS

| 3,337,629 | 8/1967 | Smiley | 260—583 C |
| 3,344,167 | 9/1967 | Tyler III et al. | 260—583 CX |
| 3,347,925 | 10/1967 | Tyler III et al. | 260—583 C |

LELAND A. SEBASTIAN, Primary Examiner

U.S. Cl. X.R.

140—19, 20, 92